US012587628B2

(12) United States Patent
Mok

(10) Patent No.: US 12,587,628 B2
(45) Date of Patent: Mar. 24, 2026

(54) DISPLAY DEVICE AND METHOD OF DRIVING THE SAME

(71) Applicant: SAMSUNG DISPLAY CO., LTD., Yongin-si (KR)

(72) Inventor: Rang Kyun Mok, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/731,459

(22) Filed: Jun. 3, 2024

(65) Prior Publication Data

US 2025/0106374 A1 Mar. 27, 2025

(30) Foreign Application Priority Data

Sep. 26, 2023 (KR) ........................ 10-2023-0129720

(51) Int. Cl.
| | |
|---|---|
| *H04N 13/305* | (2018.01) |
| *G02B 27/00* | (2006.01) |
| *G06F 3/01* | (2006.01) |
| *G09G 3/00* | (2006.01) |

(52) U.S. Cl.
CPC ....... *H04N 13/305* (2018.05); *G02B 27/0093* (2013.01); *G06F 3/013* (2013.01); *G09G 3/001* (2013.01); *G09G 2320/068* (2013.01); *G09G 2354/00* (2013.01)

(58) Field of Classification Search
CPC .. H04N 13/305; H04N 13/383; H04N 13/117; G02B 27/0093; G06F 3/013; G09G 3/001; G09G 2320/068; G09G 2354/00
See application file for complete search history.

(56) References Cited

U.S. PATENT DOCUMENTS

| | | | |
|---|---|---|---|
| 9,304,387 B2 | 4/2016 | Park et al. | |
| 2017/0018121 A1* | 1/2017 | Lawson | .................. G06V 40/10 |
| 2019/0058874 A1* | 2/2019 | Kim | ..................... H04N 13/398 |

FOREIGN PATENT DOCUMENTS

| | | |
|---|---|---|
| KR | 10-1524680 | 5/2015 |
| KR | 10-2000144 | 7/2019 |

* cited by examiner

*Primary Examiner* — Nasim N Nirjhar
(74) *Attorney, Agent, or Firm* — F. CHAU & ASSOCIATES, LLC

(57) ABSTRACT

A display device includes a display panel including pixels, a viewing area forming unit forming a main viewing zone and side viewing zones where viewpoint images displayed by the display panel are provided, and an eye tracking unit extracting binocular information of a viewer. The display device further includes a controller controlling viewing angles of the side viewing zones to be different from a viewing angle of the main viewing zone based on the binocular information.

18 Claims, 8 Drawing Sheets

MI1<MI2<MI3

1000

200

100

PX

Voxel(3D pixel)

$$y = 0.0408x^2 - 13.451x + 1305.2$$

BOTH EYE COORDINATE DIFFERENCE(pixel)

DISPLAY DEVICE AND METHOD OF DRIVING THE SAME

CROSS-REFERENCE TO RELATED APPLICATION(S)

This application claims priority to and the benefit of Korean Patent Application No. 10-2023-0129720 under 35 U.S.C. § 119, filed on Sep. 26, 2023, in the Korean Intellectual Property Office, the entire contents of which are incorporated by reference herein.

BACKGROUND

1. Technical Field

One or more embodiments described herein relate to a display device and a method of driving the display device.

2. Description of Related Art

A display device may stimulate the visual senses of a viewer like a real object does. Some display devices provide physical factors to allow a three-dimensional image to be perceived. A three-dimensional image (3D) may be perceived, for example, by providing different images to left and right eyes of a viewer. The result is to produce a 3D image due to binocular parallax between the left and right eyes.

SUMMARY

One or more embodiments described herein provide a display device that can improve the resolution and viewing angle of a 3D image through eye tracking, and a method of driving the display device. Other improvements and features of the disclosed embodiments are discussed in detail below.

An embodiment of the present disclosure, a display device may include: a display panel including pixels, a viewing area forming unit (or viewing area controller) configured to form a main viewing zone and side viewing zones where viewpoint images displayed by the display panel are provided, an eye tracking unit (or eye tracker) configured to extract binocular information of a viewer, and a controller controlling viewing angles of the side viewing zones to be different from a viewing angle of the main viewing zone based on the binocular information.

The controller may change the viewing angles of the side viewing zones based on a rotation angle of the viewer. The controller may change the viewing angles of the side viewing zones to be larger than the viewing angle of the main viewing zone. The controller may increase the viewing angles of the side viewing zones as the rotation angle of the viewer increases.

The viewing area forming unit may include lenticular lenses or micro lenses.

The eye tracking unit may include first sensors calculating a binocular position and a rotation angle of the viewer, and a second sensor calculating a viewing distance of the viewer.

The first sensors and the second sensor may be disposed below the display panel. The first sensors may be located at a top position, and the second sensor may be located at a bottom position.

The controller may include a first mapping unit (or first mapper) generating first mapping data in which the viewpoint images are mapped to the pixels based on the binocular position and the viewing distance of the viewer, and a second mapping unit (or second mapper) generating second mapping data in which the viewpoint images are remapped to the pixels based on the first mapping data and the rotation angle of the viewer.

In the second mapping data, the viewing angles of the side viewing zones may be larger than the viewing angle of the main viewing zone. In the second mapping data, the viewing angles of the side viewing zones may increase as the rotation angle of the viewer increases.

The display panel may display the viewpoint images based on the second mapping data.

An embodiment of the present disclosure, a method of driving a display device may include: extracting first binocular information and second binocular information of a viewer, generating first mapping data in which viewpoint images are mapped to pixels based on the first binocular information, generating second mapping data in which the viewpoint images are remapped to the pixels based on the first mapping data and the second binocular information, and displaying the viewpoint images based on the second mapping data.

The first binocular information may include a binocular position and a viewing distance of the viewer, and the second binocular information may include a rotation angle of the viewer.

Generating the second mapping data may include controlling a viewing angle of a main viewing zone and viewing angles of side viewing zones where the viewpoint images are provided differently.

The viewing angles of the side viewing zones may be controlled to be larger than the viewing angle of the main viewing zone. The viewing angles of the side viewing zones may be controlled to increase as the rotation angle of the viewer increases.

In accordance with one or more embodiments, a controller for a display device includes a first mapper configured to generate first mapping data based on first binocular information output from an eye tracker; and a second mapper configured to generate second mapping data based on the first mapping data and second binocular information output from the eye tracker, the second mapping data to control display of viewpoint images on the display device, wherein: the first binocular information indicates a binocular position of the eyes of a viewer and a viewing distance of the viewer, and the second binocular information indicates a rotation angle of the viewer.

The second mapping data may allow image resolution and viewing angle to be increased at a same time. The first mapping data may correspond to a mapping of the viewpoint images to pixels of the display device based on the binocular position of the eyes of the viewer and the viewing distance of the viewer. The second mapping data may correspond to a remapping of the viewpoint images to the pixels of the display device based on the rotation angle of the viewer.

BRIEF DESCRIPTION OF THE DRAWINGS

The above and other features of the disclosure will become more apparent by describing in further detail embodiments thereof with reference to the accompanying drawings, in which.

DETAILED DESCRIPTION OF THE EMBODIMENTS

Figure 1:
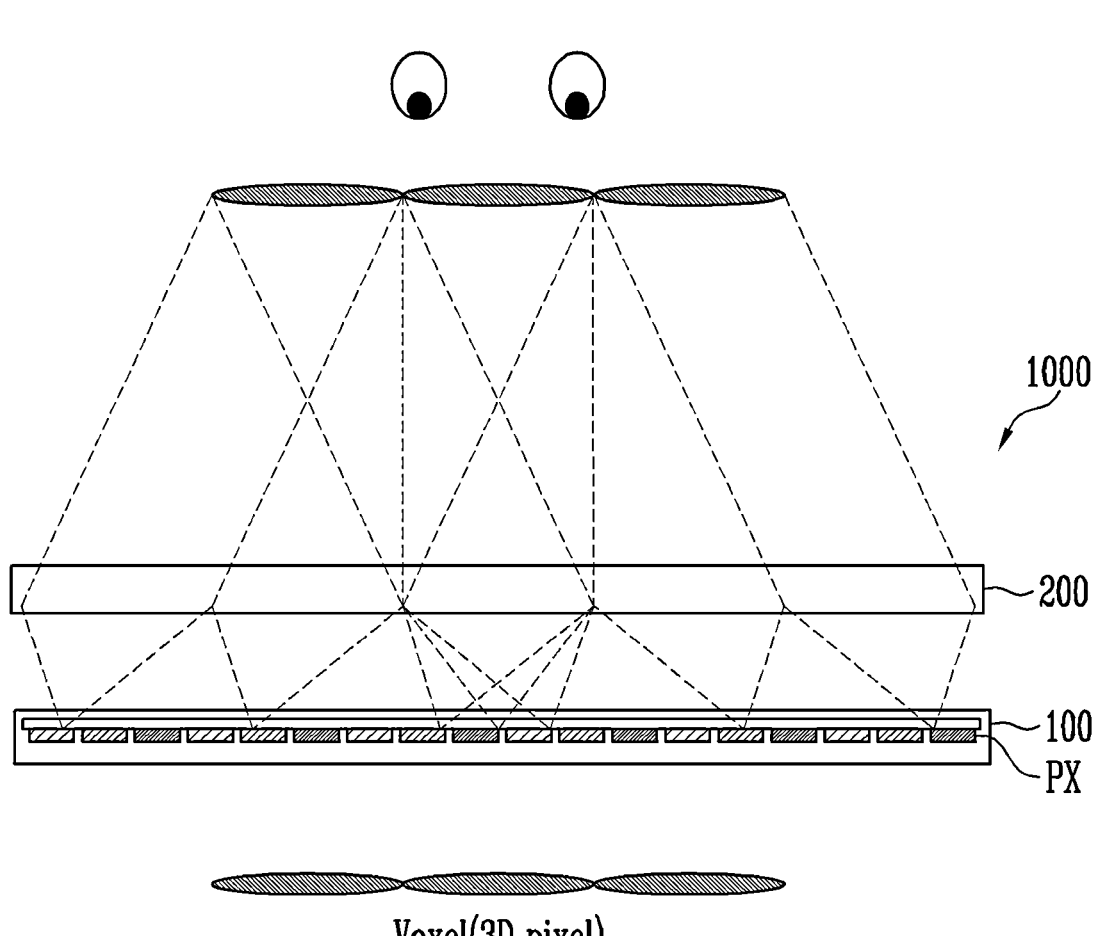
FIG. 1 is a cross-sectional view schematically illustrating a display device in accordance with an embodiment.

The disclosure now will be described more fully hereinafter with reference to the accompanying drawings, in which various embodiments are shown. This disclosure may, however, be embodied in many different forms, and should not be construed as limited to the embodiments set forth herein. Rather, these embodiments are provided so that this disclosure will be more thorough and complete, and will convey the scope of the disclosure to those skilled in the art.

In describing the drawings, like reference numerals have been used for like elements. In the accompanying drawings, the dimensions of the structures are enlarged more than the actual size in order to clearly explain the disclosure.

It will be understood that, although the terms "first", "second", etc. may be used herein to describe various elements, these elements should not be limited by these terms. These terms are only used to distinguish one element from another element. For instance, a first element discussed below could be termed a second element without departing from the scope of the disclosure. Similarly, the second element could also be termed the first element.

The terminology used herein is for the purpose of describing embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." The terms "and" and "or" mean "and/or." As used herein, the term "and/or" includes any and all combinations of one or more of the associated listed items.

It will be further understood that the terms "comprises," "comprising," "includes," and/or "including,", "has," "have," and/or "having," and variations thereof when used in this specification, specify the presence of stated features, integers, steps, operations, elements, components, and/or groups thereof, but do not preclude the presence or addition of one or more other features, integers, steps, operations, elements, components, and/or groups thereof.

When an element is referred to as being "on," "connected to," or "coupled to" another element, it may be directly on, connected to, or coupled to the other element or intervening elements or layers may be present. When, however, an element is referred to as being "directly on," "directly connected to," or "directly coupled to" another element, there are no intervening elements or layers present. To this end, the term "connected" may refer to physical, electrical, and/or fluid connection, with or without intervening elements.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would be oriented "above" the other elements. The terms "below" or "beneath" can, therefore, encompass both an orientation of above and below.

Unless otherwise defined or implied herein, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the disclosure, and will not be interpreted in an idealized or overly formal sense unless expressly so defined herein.

Hereinafter, embodiments of the disclosure are described in detail with reference to the accompanying drawings.

Figure 2:
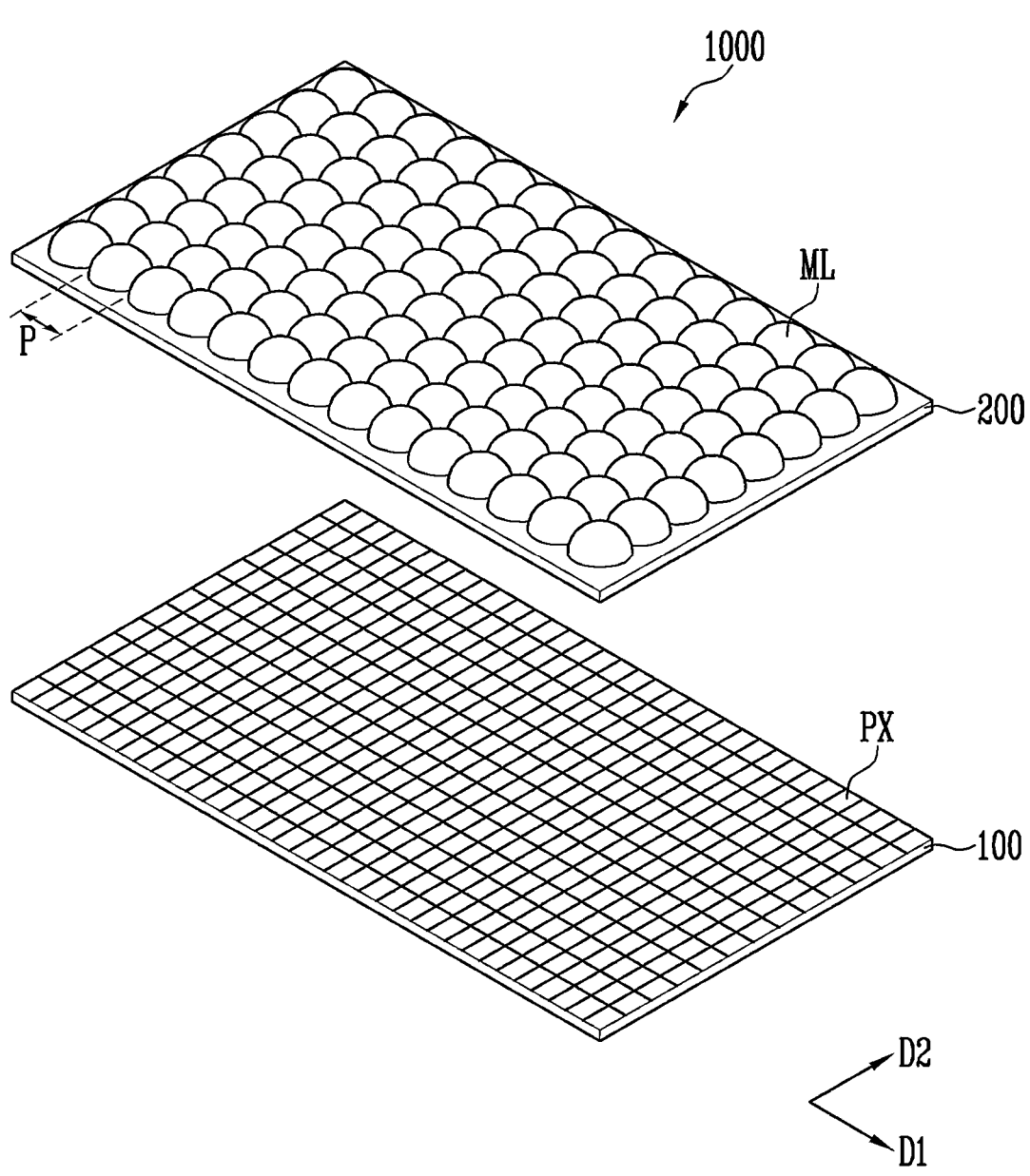
FIGS. 2 and 3 are exploded perspective views schematically illustrating the display device in accordance with an embodiment.
Figure 3:
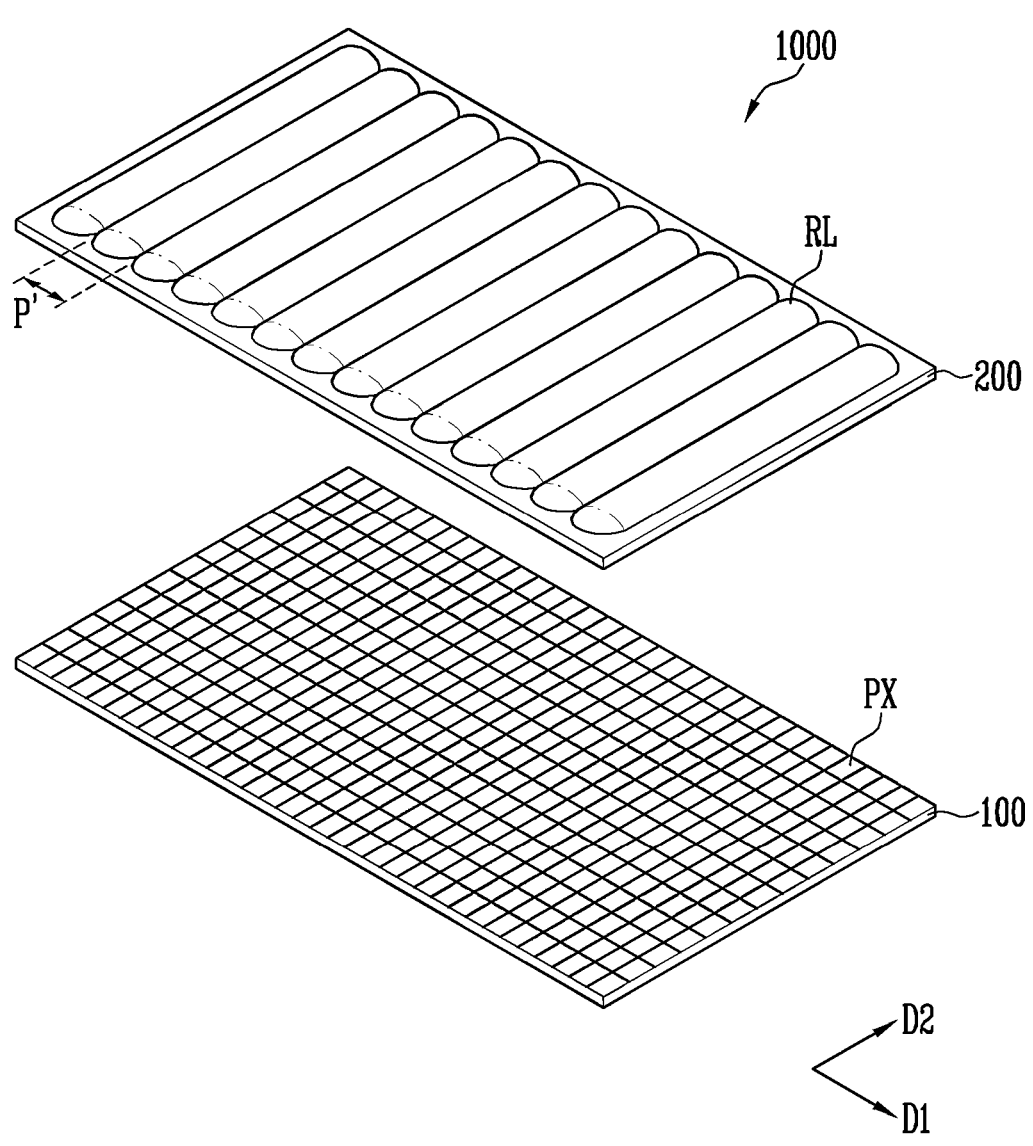

FIG. 1 is a cross-sectional view schematically illustrating a display device 1000 in accordance with an embodiment. FIGS. 2 and 3 are exploded perspective views schematically illustrating the display device 1000 in accordance with an embodiment.

Referring to FIG. 1, the display device 1000 may include a display panel 100 and a viewing area forming unit (or viewing area controller) 200.

The display panel 100 may include pixels PX that emit light to display an image. The pixels PX may be disposed on a front surface of the display panel 100 to form a light emitting surface, and an image may be displayed based on light emitted from the pixels PX. Each of the pixels PX may emit light of one of a plurality of predetermined colors. Examples include red light, green light, and blue light. However, this is an example, and the color of light emitted from the pixels PX is not limited thereto. Light of a different combination of colors may be emitted from the pixels PX to implement display of full-color images.

The display panel 100 may be connected to a driving circuit that drives the pixels PX. For example, the driving circuit may include a controller 400 (e.g., see FIG. 4), a scan driver, and a data driver. The controller 400 may receive image data and timing signals from a processor. The scan driver may generate scan signals based on a clock signal, a scan start signal, and/or other control signals received from the controller 400. The data driver may generate data voltages for displaying a two-dimensional (2D) image or a 3D image based on the type of image data, a data control signal, and/or other signals received from the controller 400.

The display panel 100 may include a display layer disposed on a predetermined substrate to form the pixels PX. The display layer may include a pixel circuit layer and a display element layer. The display panel 100 may further include an encapsulation structure that encapsulates the display element layer. In addition, the display panel 100 may include a polarization layer including a phase retarder and/or a polarizer on the encapsulation structure.

The pixel circuit layer may include a pixel circuit configured to drive light emitting elements of the pixels PX. For example, the pixel circuit layer may include transistors and signal lines/power source lines connected to the transistors. The pixel circuit layer may have a stacked structure to form the transistors.

The display element layer may be disposed on the pixel circuit layer. The display element layer may include light emitting elements. The light emitting elements may be electrically connected to the pixel circuits of the pixel circuit layer. In an embodiment, the light emitting elements may be self-emitting light elements. Examples of a self-emitting light element include an organic light emitting element, an inorganic light emitting element, and a light emitting element composed of a combination of inorganic and organic materials. Thus, the display panel 100 may be a self-emitting light display panel. However, this is an example, and the display panel 100 may be implemented as another type of panel, e.g., a liquid crystal display panel, a plasma display panel, or a quantum dot display panel.

The viewing area forming unit (or viewing area controller) 200 may be disposed on the display panel 100. The viewing area forming unit 200 may separate viewpoint images displayed by the display panel 100 on a viewpoint basis. For example, the viewing area forming unit 200 may control the direction of light propagation so that light output from the pixels PX proceeds only to a specific viewpoint (or direction) and converges at the position of the viewer's eyes. Accordingly, different viewpoint images may be provided to left and right eyes of the viewer, respectively. Through this binocular parallax, the viewer can watch a 3D image.

A light field display is a display that implements a 3D image without the need for glasses. The display can have several people located within its field of view, with each person seeing a slightly different viewpoint, depending on their position, just like a real 3D object. A light field display forms a 3D image by forming a light field expressed as a vector distribution (for example, intensity, direction, or the like) of light in space using the display panel 100 and the viewing area forming unit 200. The light field display may implement a more natural stereoscopic image because a viewer can see the depth and side of an object. Such a display technology is expected to be used in various ways, for example, through convergence with AR (Augmented Reality) technology, or the like.

A light field may be implemented using various methods. For example, a light field may be formed by a method to create multi-directional light fields using multiple projectors, a method of controlling the direction of light using a diffraction grating, a method of adjusting the direction and intensity (luminance) of light according to the combination of each pixel using two or more panels, a method for controlling the direction of light using a pinhole or barrier, or a method for controlling the direction in which light is refracted through a lens array.

The light emitted from the pixels PX may be refracted (or diffracted) by the viewing area forming unit 200 and proceeds only in a specific direction, to form a light field expressed by the intensity and direction of light. When a viewer looks at the display device 1000 within the light field formed as described above, the viewer can perceive a three-dimensional effect of a corresponding image.

In one embodiment, image information according to the viewpoint of the viewer within the light field may be defined and processed in units of voxels. A voxel may be understood as graphic information defining a predetermined point (or pixel) in a 3D space.

Referring to FIGS. 2 and 3, the pixels PX may be arranged in a predetermined shape, e.g., the pixels PX may be arranged in a first direction D1 and a second direction D2 substantially perpendicular to the first direction D1. However, the arrangement of the pixels PX described above is only an example and is not limited thereto. For example, in one embodiment, the pixels PX may be arranged in a PENTILE™ shape.

Referring to FIG. 2, in an embodiment, the viewing area forming unit 200 may include micro lenses ML. Light generated from the pixels PX of the display panel 100 may pass through the micro lenses ML to form a light field. In one embodiment, the micro lenses ML may be composed of active lenses. For example, the micro lenses ML may form an electric field by an applied voltage, and the arrangement of liquid crystal molecules may be modified accordingly. As a result, the viewing area forming unit 200 may allow the image displayed on the display panel 100 to be transmitted as is in a 2D display mode, and may separate viewing areas of the viewpoint images displayed on the display panel 100 in a 3D display mode. For example, in the 3D display mode, the viewing area forming unit 200 may allow the viewpoint images displayed on the display panel 100 to be provided to the viewing areas using light diffraction and refraction phenomena.

The arrangement of the pixels PX, the arrangement of the micro lenses ML, and the relative positional relationship between the pixels PX and the micro lenses ML in the display panel 100 to form the light field are not limited to the embodiment shown in FIG. 2, and may be implemented in various embodiments.

Image resolution (image quality) and viewing angle (Field of View) may have an opposing relationship (trade off). For example, as a pixel pitch P of the micro lenses ML decreases, the image resolution may increase, but the viewing angle may become narrower. As the pixel pitch P of the micro lenses ML increases, the viewing angle may become wider, but the image resolution may decrease.

Referring to FIG. 3, in an embodiment, the viewing area forming unit 200 may include lenticular lenses RL. Light generated from the pixels PX of the display panel 100 may pass through the lenticular lenses RL to form a light field. The lenticular lenses RL may be arranged in one direction. For example, the lenticular lenses RL may extend long in the second direction D2. Also, in one embodiment, the direction in which the lenticular lenses RL extend may be inclined at an acute angle with the second direction D2, or may be generally parallel to the second direction D2.

The arrangement of the pixels PX, the arrangement of the lenticular lenses RL, and the relative positional relationship between the pixels PX and the lenticular lenses RL in the display panel 100 to form the light field are not limited to the embodiment shown in FIG. 3, and may be implemented in various embodiments.

As previously emphasized, image resolution and viewing angle have an opposing relationship. For example, as the pixel pitch P' of the lenticular lenses RL decreases, the image resolution may increase but the viewing angle may become narrower. As the pixel pitch P' of the lenticular lenses RL increases, the viewing angle may become wider, but image resolution may decrease.

Figure 4:
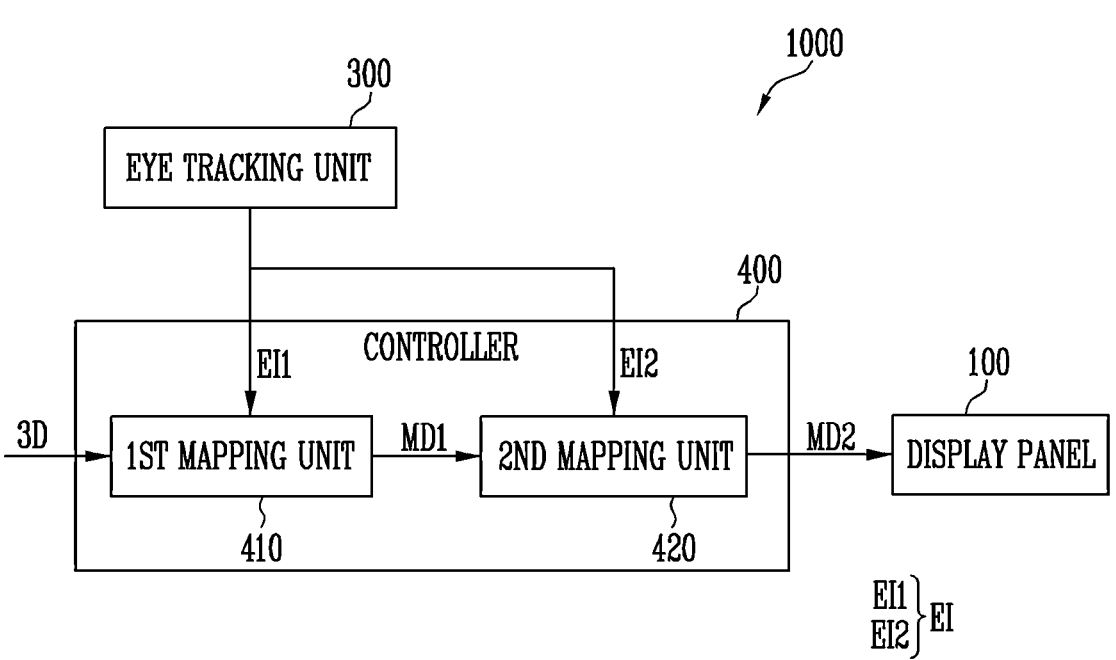
FIG. 4 is a block diagram schematically illustrating the display device in accordance with an embodiment.

FIG. 4 is a block diagram schematically illustrating the display device 1000 in accordance with an embodiment.

Referring to FIG. 4, the display device 1000 may further include an eye tracking unit (eye tracker) 300 and a controller 400. The eye tracking unit 300 may capture the eyes of a viewer in real time and extract binocular information EI of the viewer. The binocular information EI may include first binocular information EI1 including an eye binocular position and viewing distance of the viewer, and second binocular information EI2 including a rotation angle of the eyes of the viewer.

The eye tracking unit 300 may provide the first binocular information EI1 regarding the left eye position, right eye position, and viewing distance of the viewer to a first mapping unit (first mapper) 410 of the controller 400. The left eye position may refer to the center position of the left pupil of the viewer, and the right eye position may refer to the center position of the right pupil of the viewer.

The eye tracking unit 300 may provide the second binocular information EI2 regarding the rotation angle of the viewer to a second mapping unit (second mapper) 420 of the controller 400. The rotation angle may refer to an angle formed between the center of the display panel 100 and the viewer. For example, the rotation angle may be an angle formed between the center of the display panel 100 and the centers of the left and right eyes of the viewer.

The controller 400 may convert stereoscopic image data 3D into the viewpoint images based on the binocular information EI provided from the eye tracking unit 300. The stereoscopic image data 3D may include coordinate information and depth information of a 3D object. The stereoscopic image data 3D may be provided from a memory included in the display device 1000 or an external device. To perform the above-described operations, the controller 400 may include an application processor (AP), a central processing unit (CPU), a microprocessor, or another type of processing logic including but not limited to an artificial intelligence processor.

The controller 400 may map the viewpoint images to the pixels PX (e.g., see FIG. 1). In an embodiment, the controller 400 may include the first mapping unit 410 and the second mapping unit 420 that map the viewpoint images to the pixels PX based on different types of binocular information EI discussed above.

The first mapping unit 410 may generate first mapping data MD1 based on the first binocular information EI1. For example, the first mapping unit 410 may generate the first mapping data MD1 in which the viewpoint images are mapped to the pixels PX based on the binocular position of the eyes and viewing distance of the viewer. The first mapping unit 410 may provide the first mapping data MD1 to the second mapping unit 420.

The second mapping unit 420 may generate second mapping data MD2 based on the second binocular information EI2 output from the eye tracking unit 300. For example, the second mapping unit 420 may generate the second mapping data MD2 in which the viewpoint images are remapped to pixels PX based on the rotation angle of the viewer. The second mapping unit 420 may provide the second mapping data MD2 to the display panel 100.

The display panel 100 may display the viewpoint images based on the second mapping data MD2. Since the display panel 100 displays the viewpoint images based on the second mapping data MD2 (which reflects the rotation angle of the viewer as well as the binocular position and viewing distance of the viewer), image resolution and viewing angle of the 3D image can both be improved at the same time, i.e., image resolution and viewing angle are no longer inversely proportional.

Figure 5:
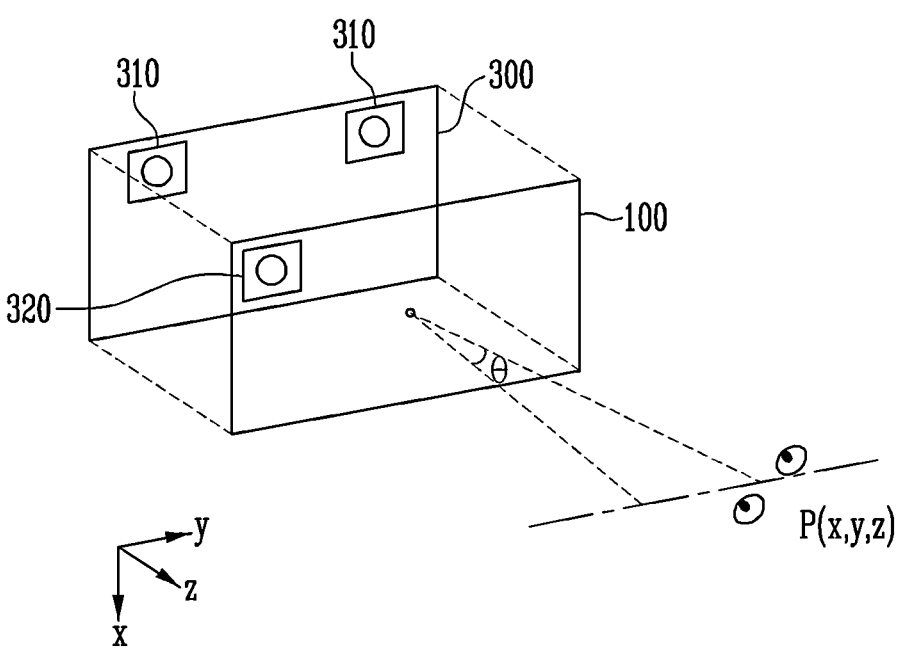
FIG. 5 is a diagram schematically illustrating an eye tracking unit in accordance with an embodiment.

FIG. 5 is a diagram schematically illustrating the eye tracking unit 300 in accordance with an embodiment.

Referring to FIG. 5, the eye tracking unit 300 may include first sensors 310 and a second sensor 320. The first sensors 310 and the second sensor 320 may be disposed at predetermined positions of the display panel, e.g., at different positions below the display panel 100. Accordingly, compared to the case where the first sensors 310 and the second sensor 320 are located outside the display panel 100, the overall size of the display device 1000 (see FIG. 1) can be reduced as the size of a bezel is reduced, and more precise tracking can be possible.

The first sensors 310 may calculate the binocular position and rotation angle of the viewer. For example, the first sensors 310 may calculate x, y coordinates and rotation angle $\theta$ according to the position P of the viewer based on the display panel 100. Below the display panel 100, the first sensors 310 may be located at a top or upper location. The first sensors 310 may be implemented as a web camera, monocular camera, stereo camera, multi-camera, or the like.

FIG. 5 shows two first sensors 310 included in the eye tracking unit 300. However, this is only an example, and the present disclosure is not limited thereto. For example, the number of first sensors 310 included in the eye tracking unit 300 may be three or more.

The second sensor 320 may calculate the viewing distance of the viewer. For example, the second sensor 320 may calculate z coordinates according to the position P of the viewer based on the display panel 100. Below the display panel 100, the second sensor 320 may be located at a bottom or lower location relative to the first sensors 310. The second sensor 320 may be implemented as a stereo camera, depth camera, or the like to detect the viewing distance (the z coordinate) of the viewer.

FIG. 5 shows one second sensor 320 included in the eye tracking unit 300. However, this is only an example, and the present disclosure is not limited thereto. For example, the number of second sensors 320 included in the eye tracking unit 300 may be two or more.

Figure 6:
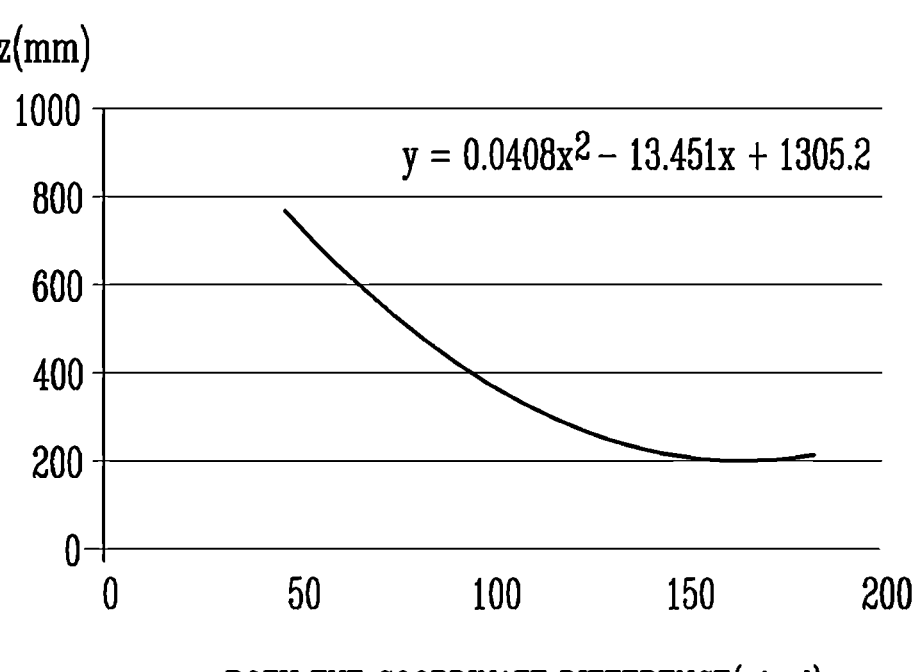
FIG. 6 is a graph illustrating a viewing distance corresponding to a difference in coordinates between left and right eyes of a viewer according to an embodiment.

FIG. 6 is a graph illustrating a viewing distance corresponding to a difference in coordinates between left and right eyes of a viewer.

Referring to FIGS. 5 and 6, the eye tracking unit 300 may capture the eyes of the viewer in real time and extract a difference in coordinates between the left and right eyes of the viewer. In this case, the difference in coordinates between the left and right eyes may be expressed in units of pixels.

The graph shown in FIG. 6 shows a calibration function in which the viewing distance z is experimentally derived for each difference in coordinates between the left and right eyes of the viewer when a distance between the left and right eyes of the viewer is 62 mm. In this case, the calibration function may be derived by reflecting y coordinates as well as x coordinates of the left and right eyes of the viewer, and may be expressed as Equation 1 below.

$$y = 0.0408\,x^2 - 13.451\,x + 1305.2 \tag{1}$$

where x may be the difference in coordinates between the left and right eyes of the viewer and y may be the viewing distance (that is, z) of the viewer. For example, when the difference in coordinates between the left and right eyes of the viewer calculated by the eye tracking unit 300 is 50 pixels, the viewing distance z of the viewer according to the calibration function may be approximately 735 mm.

As an example, the calibration function was derived assuming that the distance between the left and right eyes of the viewer is 62 mm, but the present disclosure is not limited thereto. The calibration function may also be derived for different distances between the left and right eyes of the viewer.

Figure 7:
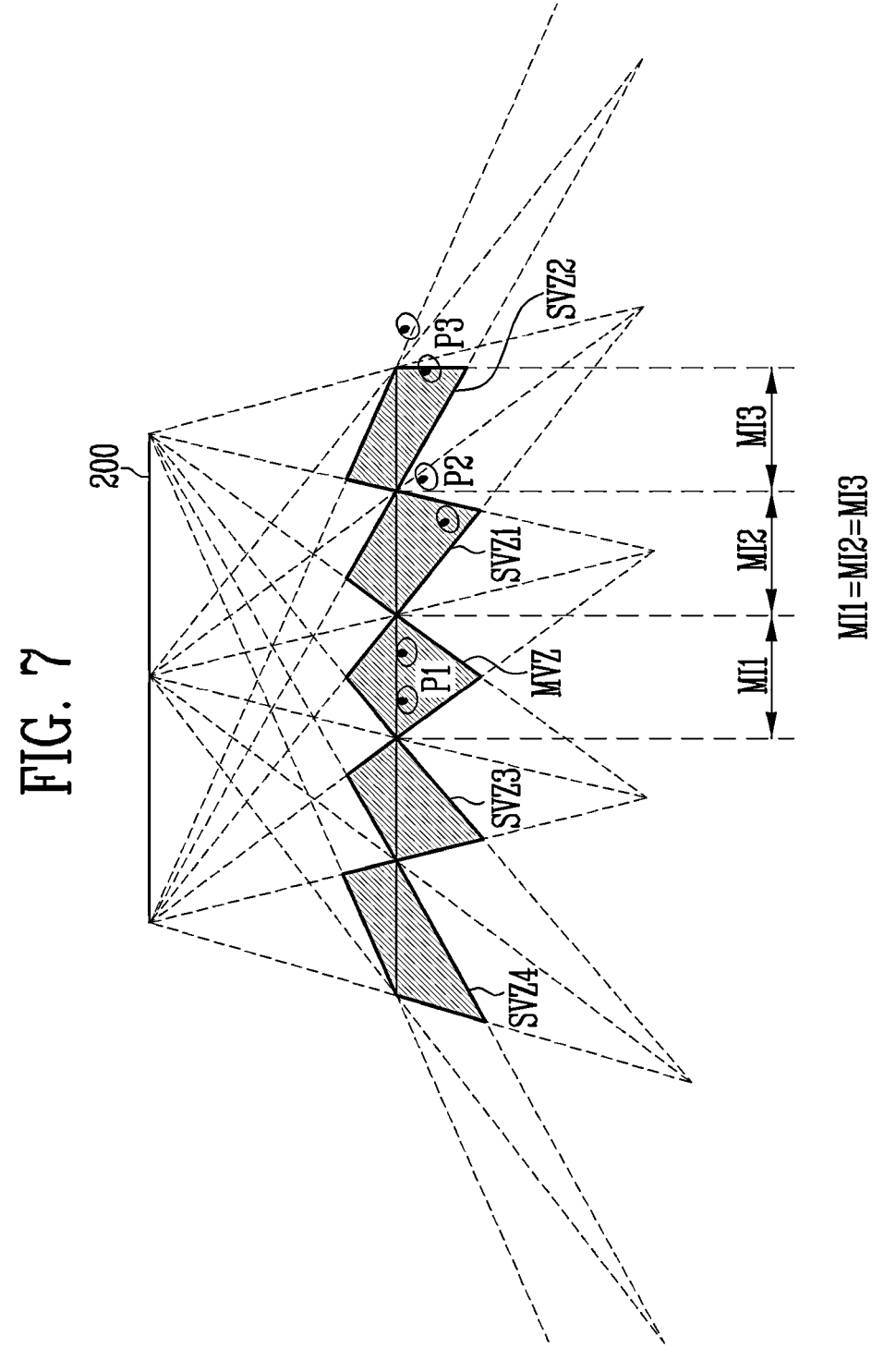
FIG. 7 is a diagram schematically illustrating viewing zones according to first mapping data according to an embodiment.

FIG. 7 is a diagram schematically illustrating viewing zones according to first mapping data.

Referring to FIGS. 4 and 7, when the display panel 100 displays the viewpoint images based on the first mapping data MD1 generated by the first mapping unit 410, the viewing area forming unit 200 may form a main viewing zone MVZ and side viewing zones SVZ1, SVZ2, SVZ3, and SVZ4 where the viewpoint images displayed by the display panel 100 are provided.

The main viewing zone MVZ may refer to a viewing zone formed in front of the viewing area forming unit 200 according to the binocular position and viewing distance of the viewer. For example, the main viewing zone MVZ may be formed in front of the viewing area forming unit 200 according to the binocular position and viewing distance of the viewer corresponding to a first position P1. Thus, the first position P1 may have a rotation angle of 0 degrees.

The viewpoint images may be provided in the main viewing zone MVZ. For example, when the display panel 100 displays n viewpoint images, the viewing area forming unit 200 may refract (or diffract) the n viewpoint images and project them onto the main viewing zone MVZ. The viewpoint images may be sequentially arranged within a maximum width MI1 of the main viewing zone MVZ. In this case, the maximum width MI1 of the main viewing zone MVZ may mean a viewing angle of the main viewing zone MVZ. For example, the expression that the maximum width MI1 of the main viewing zone MVZ is large may mean that the viewing angle of the main viewing zone MVZ is large.

The side viewing zones SVZ1, SVZ2, SVZ3, and SVZ4 may refer to viewing zones formed on left and right sides of the main viewing zone MVZ, e.g., at non-zero rotation angles. For example, a first side viewing zone SVZ1 and a second side viewing zone SVZ2 may be sequentially formed on the right side of the main viewing zone MVZ. A third side viewing zone SVZ3 and a fourth side viewing zone SVZ4 may be sequentially formed on the left side of the main viewing zone MVZ. The maximum widths of the side viewing zones SVZ1, SVZ2, SVZ3, and SVZ4 may be the same or different widths, as described in greater detail herein. In FIG. 7, four side viewing zones SVZ1, SVZ2, SVZ3, and SVZ4 are formed on the left and right sides of the main viewing zone MVZ, but this is only an example, and a different number of viewing zones may be included at the left and/or right sides of the main viewing zone MVZ.

In one embodiment, the side viewing zones SVZ1, SVZ2, SVZ3, and SVZ4 may be symmetrically arranged relative to the main viewing zone MVZ. For example, the third side viewing zone SVZ3 may be symmetrical to the first side viewing zone SVZ1 and may perform substantially the same function. The fourth side viewing zone SVZ4 may be symmetrical to the second side viewing zone SVZ2 and may perform substantially the same function. Therefore, hereinafter, for convenience of description, the first side viewing zone SVZ1 and the second side viewing zone SVZ2 will be representatively described.

The viewpoint images may be provided in the side viewing zones SVZ1, SVZ2, SVZ3, and SVZ4. For example, when the display panel 100 displays n viewpoint images, the viewing area forming unit 200 may refract (or diffract) the n viewpoint images and project them onto respective ones of the side viewing zones SVZ1, SVZ2, SVZ3, and SVZ4. In one embodiment, the viewpoint images may be sequentially arranged within a maximum width MI2 of the first side viewing zone SVZ1 and a maximum width MI3 of the second side viewing zone SVZ2. In this case, the maximum width MI2 of the first side viewing zone SVZ1 may correspond to the viewing angle of the first side viewing zone SVZ1, and the maximum width MI3 of the second side viewing zone SVZ2 may correspond to the viewing angle of the second side viewing zone SVZ2. For example, the expression that the maximum width MI2 of the first side viewing zone SVZ1 is large may mean that the viewing angle of the first side viewing zone SVZ1 is large, and the expression that the maximum width MI3 of the second side viewing zone SVZ2 is large may mean that the viewing angle of the second side viewing zone SVZ2 is large.

As shown in FIG. 7, in one embodiment, the side viewing zones SVZ1, SVZ2, SVZ3, and SVZ4 may be formed to have the same maximum width (or viewing angle) as the main viewing zone MVZ. For example, the maximum width MI2 of the first side viewing zone SVZ1 and the maximum width MI3 of the second side viewing zone SVZ2 may be the same as the maximum width MI1 of the main viewing zone MVZ. In this case, when the viewer is in the first position P1, the viewer may watch the 3D image in the main viewing zone MVZ. However, when the viewer is in the second position P2 or a third position P3, the viewer may watch an inverted image in a border area of the first side viewing zone SVZ1 or a border area of the second side viewing zone SVZ2. In another embodiment, the maximum widths of the first and second side viewing zones SVZ1 and SVZ2 may be different from the maximum width of the main viewing zone MVZ.

Figure 8:
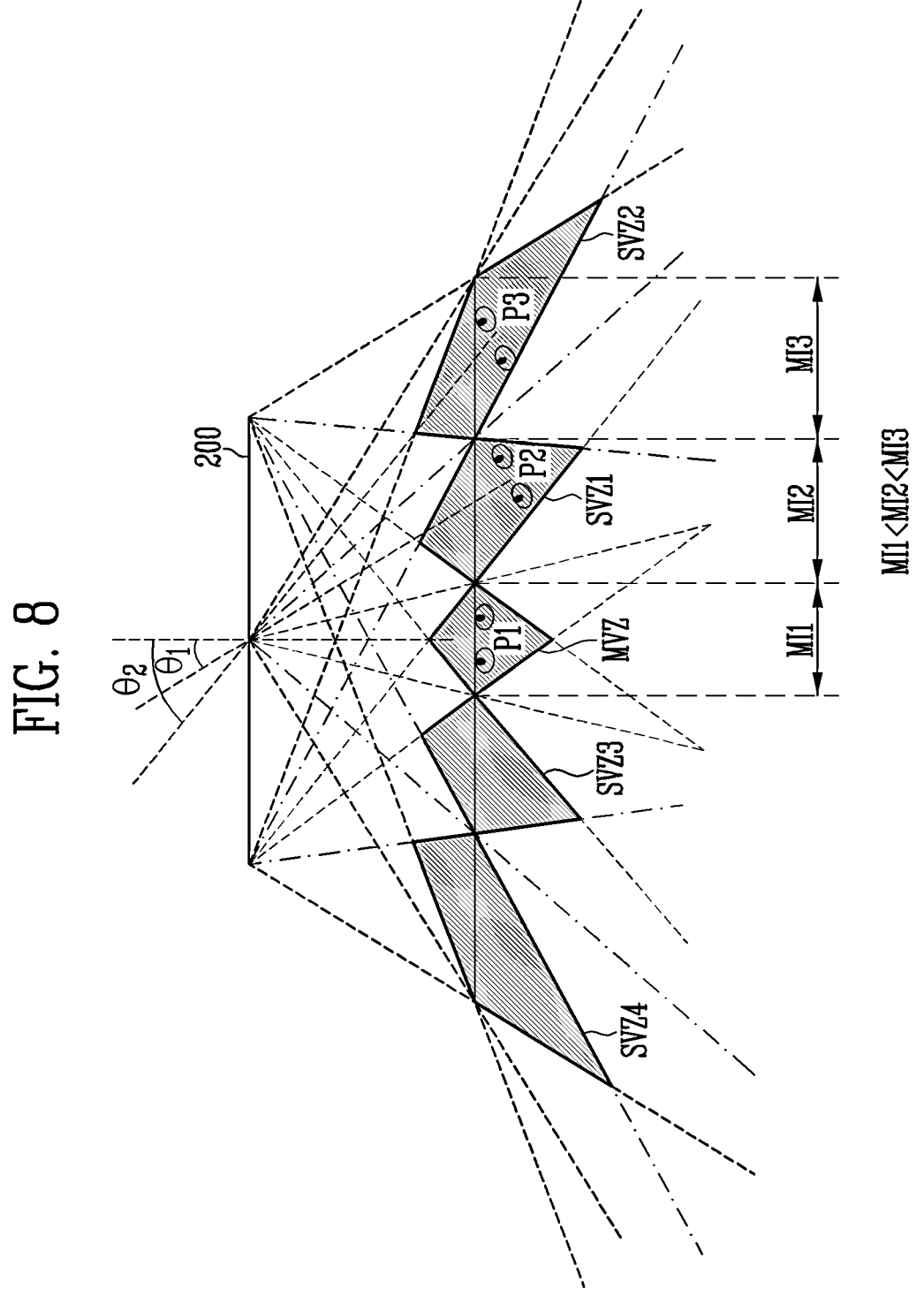
FIG. 8 is a diagram schematically illustrating viewing zones according to second mapping data according to an embodiment.

FIG. 8 is a diagram schematically illustrating viewing zones according to second mapping data in accordance with an embodiment of the invention.

Referring to FIGS. 4 and 8, the controller 400 may control the maximum width (or viewing angle) of the side viewing zones SVZ1, SVZ2, SVZ3, and SVZ4 and the maximum width (or viewing angle) of the main viewing zone MVZ differently based on the binocular information EI provided from the eye tracking unit 300. For example, the controller 400 may change the maximum width (or viewing angle) of the side viewing zones SVZ1, SVZ2, SVZ3, and SVZ4 based on the rotation angle of the viewer indicated by the eye tracking unit 300. For example, the controller 400 may change the maximum width (or viewing angle) of the side viewing zones SVZ1, SVZ2, SVZ3, and SVZ4 to be greater than the maximum width (or viewing angle) of the main viewing zone MVZ.

In one embodiment, the second mapping unit 420 of the controller 400 may generate the second mapping data MD2 in which the viewpoint images are remapped to the pixels PX (see FIG. 1) based on the first mapping data MD1 and the second binocular information EI2 regarding the rotation angle of the viewer. In this case, in the second mapping data MD2, the maximum width (or viewing angle) of one or more of the side viewing zones SVZ1, SVZ2, SVZ3, and SVZ4 may be greater than the maximum width (or viewing angle) of the main viewing zone MVZ. In one embodiment, the maximum width (or the viewing angles) of the side viewing zones SVZ1, SVZ2, SVZ3, and SVZ4 may be controlled to be different from one another.

Accordingly, when the display panel 100 displays the viewpoint images based on the second mapping data MD2 generated by the second mapping unit 420, the viewing area forming unit 200 may form the main viewing zone MVZ where the viewpoint images displayed by the display panel 100 are provided and the side viewing zones SVZ1, SVZ2, SVZ3, and SVZ4 having the maximum width (or viewing angle) different from the main viewing zone MVZ.

As shown in FIG. 8, the side viewing zones SVZ1, SVZ2, SVZ3, and SVZ4 may be formed to have the maximum width (or viewing angle) larger than the main viewing zone MVZ according to the rotation angle of the viewer.

For example, when the rotation angle corresponding to the second position P2 of the viewer is $\theta1$, the maximum width MI2 of the first side viewing zone SVZ1 may be greater than the maximum width MI1 of the main viewing zone MVZ. Thus, the maximum width MI2 of the first side viewing zone SVZ1 may increase in response to the rotation angle $\theta1$ of the viewer.

For example, when the rotation angle corresponding to the third position P3 of the viewer is $\theta2$, the maximum width MI3 of the second side viewing zone SVZ2 may be greater than the maximum width MI1 of the main viewing zone MVZ and the maximum width MI2 of the first side viewing zone SVZ1. That is, the maximum width MI3 of the second side viewing zone SVZ2 may increase in response to an increase in the rotation angle, i.e., the rotation angle $\theta2$ of the viewer. As the rotation angle of the viewer further increases to $\theta2$, a change rate of the maximum width MI3 of the second side viewing zone SVZ2 may be greater than a change rate of the maximum width MI2 of the first side viewing zone SVZ1.

As the maximum width MI2 of the first side viewing zone SVZ1 increases, the viewer in the second position P2 may also watch the 3D image in the first side viewing zone SVZ1 without an inverted image. Also, as the maximum width MI3 of the second side viewing zone SVZ2 increases, the viewer in the third position P3 may also watch the 3D image in the second side viewing zone SVZ2 without an inverted image.

As described above, according to the embodiments of the present disclosure, when the rotation angle of the viewer increases (by controlling the maximum width (or viewing angle) of the side viewing zones SVZ1, SVZ2, SVZ3, and SVZ4 to be greater than the maximum width (or viewing angle) of the main viewing zone MVZ), the resolution and viewing angle of the 3D image can be improved.

Figure 9:
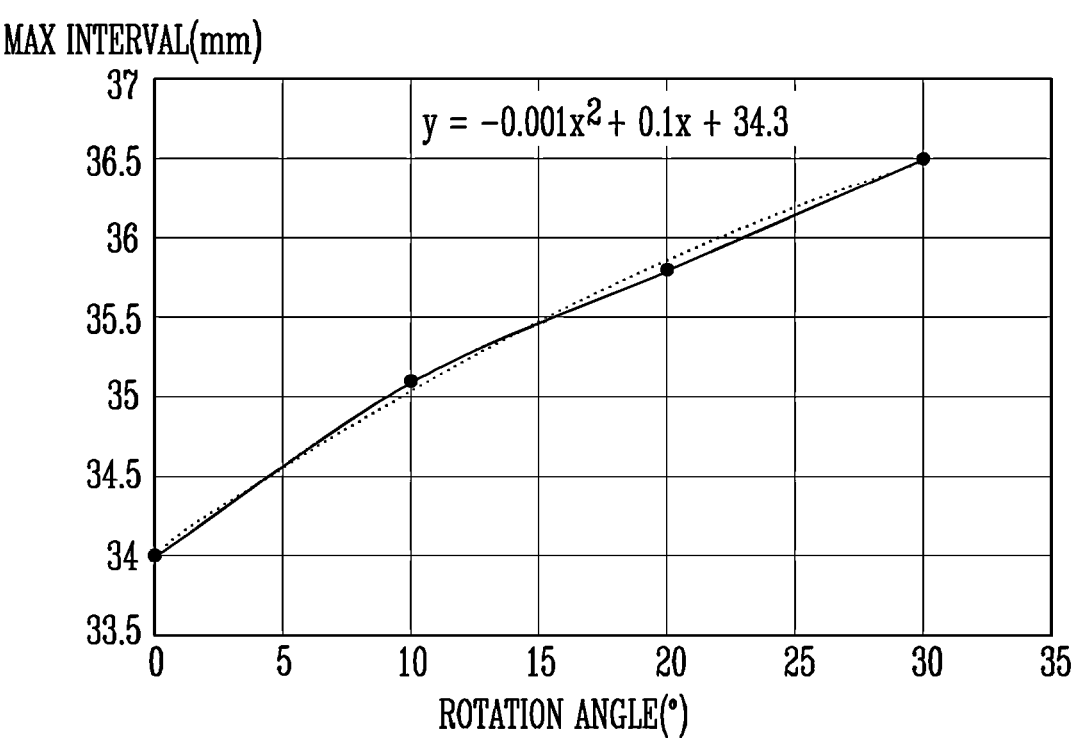
FIG. 9 is a graph illustrating a maximum width of a viewing zone corresponding to a rotation angle of the viewer according to an embodiment.

FIG. 9 is a graph illustrating a maximum width of a viewing zone corresponding to a rotation angle of the viewer according to an embodiment.

Referring to FIGS. 5, 8, and 9, the eye tracking unit 300 may capture the eyes of the viewer in real time and extract the rotation angle of the viewer. The graph shown in FIG. 9 shows an example of a calibration function in which the maximum width of the viewing zone according to a change in the rotation angle of the viewer based on the front of the display panel 100 is experimentally derived, and may be expressed as Equation 2 below.

$$y = -0.001\,x^2 + 0.1\,x + 34.3 \qquad (2)$$

where, x is the rotation angle of the viewer and y is the maximum width of the viewing zone.

For example, with respect to Equation 2, when the rotation angle of the viewer is 0°, the maximum width MI1 of the main viewing zone MVZ according to the calibration function may be approximately 34 mm. When the viewer is positioned in front of the display panel 100, the rotation angle of the viewer may be 0°. When the rotation angle of the viewer is 10°, the maximum width MI2 of the side viewing zone SVZ1 according to the calibration function may be approximately 35.1 mm and the change rate may be approximately 3.2%. In addition, when the rotation angle of the viewer is 20°, the maximum width MI3 of the side viewing zone SVZ2 according to the calibration function may be approximately 35.8 mm and the change rate may be approximately 5.3%. In this way, as the rotation angle of the viewer increases, the maximum width (or viewing angle) of the side viewing zones SVZ1, SVZ2, SVZ3, and SVZ4 may increase at a predetermined or desired rate.

According to the embodiments of the present disclosure, a display device that can improve the resolution and viewing angle of a 3D image through eye tracking and a method of driving the same can be provided.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods herein.

Also, another embodiment may include a computer-readable medium, e.g., a non-transitory computer-readable medium, for storing the code or instructions described above. The computer-readable medium may be a volatile or non-volatile memory or other storage device, which may be removably or fixedly coupled to the computer, processor, controller, or other signal processing device which is to execute the code or instructions for performing the method embodiments or operations of the apparatus embodiments herein.

The controllers, processors, devices, modules, units, logic, and other signal generating and signal processing features of the embodiments disclosed herein may be implemented, for example, in non-transitory logic that may include hardware, software, or both. When implemented at least partially in hardware, the controllers, processors, devices, modules, units, logic, and other signal generating and signal processing features may be, for example, any one of a variety of integrated circuits including but not limited to an application-specific integrated circuit, a field-programmable gate array, a combination of logic gates, a system-on-chip, a microprocessor, or another type of processing or control circuit. In some embodiments, these features may be implemented by a neural network, machine-learning logic, or other form of artificial intelligence.

When implemented in at least partially in software, the controllers, processors, devices, modules, units, logic, and other signal generating and signal processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

The above description is an example of technical features of the disclosure, and those skilled in the art to which the disclosure pertains will be able to make various modifications and variations. Thus, the embodiments of the disclosure described above may be implemented separately or in combination with each other. The embodiments disclosed in the disclosure are intended not to limit the technical spirit of the disclosure but to describe the technical spirit of the disclosure, and the scope of the technical spirit of the disclosure is not limited by these embodiments. The protection scope of the disclosure should be interpreted by the following claims, and it should be interpreted that all technical spirits within the equivalent scope are included in the scope of the disclosure. The embodiments may be combined to form additional embodiments.

What is claimed is:

1. A display device comprising:
a display panel including pixels;
a viewing area controller configured to form a main viewing zone and side viewing zones where viewpoint images displayed by the display panel are provided;
an eye tracker configured to extract binocular information of a viewer; and
a controller configured to control viewing angles of the side viewing zones to be larger than a viewing angle of the main viewing zone based on the binocular information.

2. The display device of claim 1, wherein the controller is configured to change the viewing angles of the side viewing zones based on a rotation angle of the viewer.

3. The display device of claim 2, wherein the controller is configured to increase the viewing angles of the side viewing zones as the rotation angle of the viewer increases.

4. The display device of claim 1, wherein the viewing area controller includes lenticular lenses or micro lenses.

5. The display device of claim 1, wherein the eye tracker includes:
first sensors configured to calculate a binocular position and a rotation angle of the viewer; and
at least one second sensor configured to calculate a viewing distance of the viewer.

6. The display device of claim 5, wherein the first sensors and the at least one second sensor are disposed below the display panel.

7. The display device of claim 6, wherein the first sensors are located at a top position and the at least one second sensor is located at a bottom position.

8. The display device of claim 5, wherein the controller includes:
a first mapper configured to generate first mapping data in which the viewpoint images are mapped to the pixels based on the binocular position and the viewing distance of the viewer; and
a second mapper configured to generate second mapping data in which the viewpoint images are remapped to the pixels based on the first mapping data and the rotation angle of the viewer.

9. The display device of claim 8, wherein the controller is configured such that in the second mapping data, the viewing angles of the side viewing zones are larger than the viewing angle of the main viewing zone.

10. The display device of claim 9, wherein the controller is configured such that in the second mapping data, the viewing angles of the side viewing zones increase as the rotation angle of the viewer increases.

11. The display device of claim 8, wherein the display panel is configured to display the viewpoint images based on the second mapping data.

12. A method of driving a display device, the method comprising:
extracting first binocular information and second binocular information of a viewer;
generating first mapping data in which viewpoint images are mapped to pixels based on the first binocular information;
generating second mapping data in which the viewpoint images are remapped to the pixels based on the first mapping data and the second binocular information; and
displaying the viewpoint images based on the second mapping data,
wherein the generating of the second mapping data includes controlling viewing angles of side viewing zones to be larger than a viewing angle of a main viewing zone.

13. The method of claim 12, wherein:
the first binocular information includes a binocular position and a viewing distance of the viewer, and
the second binocular information includes a rotation angle of the viewer.

14. The method of claim 13, wherein the viewing angles of the side viewing zones are controlled to increase as the rotation angle of the viewer increases.

15. A controller for a display device, comprising:
a first mapper configured to generate first mapping data based on first binocular information output from an eye tracker; and
a second mapper configured to generate second mapping data based on the first mapping data and second binocular information output from the eye tracker, the second mapping data to control display of viewpoint images on the display device, wherein:
the first binocular information output indicates a binocular position of the eyes of a viewer and a viewing distance of the viewer,
the second binocular information output indicates a rotation angle of the viewer, and
the controller is configured such that in the second mapping data, viewing angles of side viewing zones are larger than a viewing angle of a main viewing zone.

16. The controller of claim 15, wherein the second mapping data allows image resolution and the viewing angles of the side viewing zones to be increased at a same time.

17. The controller of claim 15, wherein the first mapping data corresponds to a mapping of the viewpoint images to pixels of the display device based on the binocular position of the eyes of the viewer and the viewing distance of the viewer.

18. The controller of claim 17, wherein the second mapping data corresponds to a remapping of the viewpoint images to the pixels of the display device based on the rotation angle of the viewer.

* * * * *